(12) United States Patent
Devarajan et al.

(10) Patent No.: US 8,370,407 B1
(45) Date of Patent: *Feb. 5, 2013

(54) SYSTEMS PROVIDING A NETWORK RESOURCE ADDRESS REPUTATION SERVICE

(75) Inventors: Ganesh Devarajan, Phoenix, AZ (US); Russell Herbelin, Mesa, AZ (US); Don LeBert, Phoenix, AZ (US); Todd Redfoot, Phoenix, AZ (US); Neil Warner, Mayer, AZ (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/170,514

(22) Filed: Jun. 28, 2011

(51) Int. Cl.
*G06F 12/00* (2006.01)
*G06F 11/30* (2006.01)
*G06F 12/14* (2006.01)

(52) U.S. Cl. .................. 707/899; 713/188; 713/150
(58) Field of Classification Search .................. None
See application file for complete search history.

(56) References Cited

U.S. PATENT DOCUMENTS

| | | | |
|---|---|---|---|
| 6,725,269 B1 | 4/2004 | Megiddo et al. | |
| 6,856,963 B1 | 2/2005 | Hurwitz | |
| 2003/0172059 A1* | 9/2003 | Andrei | 707/3 |
| 2004/0138975 A1* | 7/2004 | Engel et al. | 705/35 |
| 2006/0031314 A1 | 2/2006 | Brahms et al. | |
| 2006/0095404 A1 | 5/2006 | Adelman et al. | |
| 2006/0095586 A1 | 5/2006 | Adelman et al. | |
| 2006/0200487 A1 | 9/2006 | Adelman et al. | |
| 2006/0253583 A1 | 11/2006 | Dixon | |
| 2007/0208940 A1 | 9/2007 | Adelman et al. | |
| 2008/0021890 A1 | 1/2008 | Adelman et al. | |
| 2008/0022013 A1 | 1/2008 | Adelman et al. | |
| 2008/0028100 A1 | 1/2008 | Adelman et al. | |
| 2008/0028443 A1 | 1/2008 | Adelman et al. | |
| 2008/0282338 A1* | 11/2008 | Beer | 726/12 |
| 2008/0301055 A1 | 12/2008 | Borgs et al. | |
| 2010/0083380 A1* | 4/2010 | Harris et al. | 726/24 |
| 2011/0173149 A1* | 7/2011 | Schon | 706/48 |
| 2012/0109906 A1* | 5/2012 | Wagner | 707/690 |

OTHER PUBLICATIONS

Hitlin and Rainie, Pew Internet Project Data Memo. http://www.pewinternet.org/pdfs/PIP_Datamemo_Reputation.pdf., Oct. 2004.
Golbeck and Hendler, Reputation Network Analysis for Email Filtering. http://www.ceas.cc/papers-2004/177.pdf, Jul. 2004.
Reputation-Based Mail Flow Control. IronPort Systems, Inc. http://www.ironport.com/pdf/ironport_c60_rep_based_paper.pdf., 2002.

* cited by examiner

*Primary Examiner* — Susan Chen
(74) *Attorney, Agent, or Firm* — Karl A. Fazio (57) ABSTRACT

An exemplary system for providing a network resource address reputation service may comprise a server computer configured to determine whether an event associated with a network resource address matches event signature(s) in network security device(s). If the event matches a signature, a reputation score for the network resource address may be generated. If the network resource address is not present in a first malicious network resource address database, the network resource address in association with the reputation score may be stored in a second malicious network resource address database. If the network resource address is present in the first malicious network resource address database, the reputation score may be modified to indicate a more negative reputation for the network resource address. The network resource address may then be stored in association with the modified reputation score in a second malicious network resource address database.

20 Claims, 8 Drawing Sheets

SYSTEMS PROVIDING A NETWORK RESOURCE ADDRESS REPUTATION SERVICE

CROSS REFERENCE TO RELATED PATENT APPLICATIONS

This patent application is related to U.S. patent application Ser. No. 13/170,535 entitled: "NETWORK RESOURCE ADDRESS REPUTATION SERVICE" concurrently filed herewith and also assigned to Go Daddy Operating Company, LLC.

FIELD OF THE INVENTION

The present inventions generally relate to network security and, more particularly, systems, methods, and other tools for providing a network resource address reputation service.

SUMMARY OF THE INVENTION

An example embodiment of a system for providing a network resource address reputation service may comprise one or more network security device (communicatively coupled to a network) storing a plurality of event signatures and being configured to determine whether an event associated with a network resource having a network resource address matches one or more of the plurality of event signatures, a first malicious network resource address database (communicatively coupled to the network) storing a plurality of malicious network resource addresses determined to be malicious by one or more external feeds, and one or more server (communicatively coupled to the network) configured to (upon a determination that the event matches one or more of the plurality of event signatures) generate a reputation score for the network resource address and determine whether the network resource address is present in the first malicious network resource address database. If the network resource address is present in the external malicious network resource address database, the one or more server may modify the reputation score to indicate a more negative reputation for the network resource address and store (in a second malicious network resource address database communicatively coupled to the network) the network resource address in association with the reputation score.

An example embodiment of a method of providing a network resource address reputation service may comprise the steps of determining whether an event associated with a network resource address matches one or more of a plurality of event signatures in one or more network security device. If the event associated with the network resource address matches one or more of the plurality of event signatures, the example method further may comprise the steps of generating a reputation score for the network resource address and determining whether the network resource address is present in a first malicious network resource address database. If the network resource address is not present in the first malicious network resource address database, the method further may comprise the step of storing, in a second malicious network resource address database, the network resource address in association with the reputation score. If the network resource address is present in the first malicious network resource address database, the method further may comprise the steps of modifying the reputation score to indicate a more negative reputation for the network resource address and storing, in a second malicious network resource address database, the network resource address in association with the reputation score.

The above features and advantages of the present inventions will be better understood from the following detailed description taken in conjunction with the accompanying drawings.

DETAILED DESCRIPTION

The present inventions will now be discussed in detail with regard to the attached drawing figures, which were briefly described above. In the following description, numerous specific details are set forth illustrating the Applicant's best mode for practicing the inventions and enabling one of ordinary skill in the art to make and use the inventions. It will be obvious, however, to one skilled in the art that the present inventions may be practiced without many of these specific details. In other instances, well-known machines, structures, and method steps have not been described in particular detail in order to avoid unnecessarily obscuring the present inventions. Unless otherwise indicated, like parts and method steps are referred to with like reference numerals.

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers (e.g., website owners or operators) place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

Prevalent on the Web are multimedia websites, some of which may offer and sell goods and services to individuals and organizations. Websites may consist of a single webpage, but typically consist of multiple interconnected and related webpages. Menus and links may be used to move between different webpages within the website or to move to a different website as is known in the art. The interconnectivity of webpages enabled by the Internet can make it difficult for Internet users to tell where one website ends and another begins. Websites may be created using HyperText Markup Language (HTML) to generate a standard set of tags that define how the webpages for the website are to be displayed. Such websites may comprise a collection of HTML and subordinate documents (i.e., files) stored on the Web that are typically accessible from the same Uniform Resource Locator (URL) and reside on the same server, although such files may be distributed in numerous servers.

Users of the Internet may access content providers' websites using software known as an Internet browser, such as MICROSOFT INTERNET EXPLORER or MOZILLA FIREFOX. After the browser has located the desired webpage, it requests and receives information from the webpage, typically in the form of an HTML document, and then displays the webpage content for the user. The user then may view other webpages at the same website or move to an entirely different website using the browser.

Browsers are able to locate specific websites because each website, resource, and computer on the Internet has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon (e.g., 2EDC:BA98:0332:0000:CF8A:000C:2154:7313).

IP addresses, however, even in human readable notation, are difficult for people to remember and use. A URL is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain. An example of a URL with a HTTP request and domain is: http://www.companyname.com. In this example, the "http" identifies the URL as a HTTP request and the "companyname.com" is the domain.

Domains are much easier to remember and use than their corresponding IP addresses. The Internet Corporation for Assigned Names and Numbers (ICANN) approves some Generic Top-Level Domains (gTLD) and delegates the administrative responsibility to a particular organization (a "registry") for maintaining an authoritative source for the registered domains within a TLD and their corresponding IP addresses. Such a registry may comprise any registry or other entity under contract (or other agreement) with ICANN to administer one or more TLDs, a registry operator that may comprise any entity sub-contracted with the registry to administer the TLD on behalf of the registry and make the TLD available to registrars for registration, and/or any agent operating on behalf of a registry to carry out the registries' contractual obligations with ICANN. For certain TLDs (e.g., .biz, .info, .name, and .org) the registry is also the authoritative source for contact information related to the domain and is referred to as a "thick" registry. For other TLDs (e.g., .com and .net) only the domain, registrar identification, and name server information is stored within the registry, and a registrar is the authoritative source for the contact information related to the domain. Such registries are referred to as "thin" registries. Most gTLDs are organized through a central domain Shared Registration System (SRS) based on their TLD.

The process for registering a domain with .com, .net, .org, or other TLDs allows an Internet user to use an ICANN-accredited registrar to register their domain. For example, if an Internet user, John Doe, wishes to register the domain "mycompany.com," John Doe may initially determine whether the desired domain is available by contacting a domain registrar. The Internet user may make this contact using the registrar's website and typing the desired domain into a field on the registrar's webpage created for this purpose.

Upon receiving the request from the Internet user, the registrar may ascertain whether "mycompany.com" has already been registered by checking the SRS database associated with the TLD of the domain. The results of the search then may be displayed on the registrar's website to thereby notify the Internet user of the availability of the domain. If the domain is available, the Internet user may proceed with the registration process. If the domain is not available for registration, the Internet user may keep selecting alternative domains until an available domain is found. When a domain is registered, the registrar may pay a registration fee to the registry responsible for administering the TLD used by the registered domain. Continuing with the previous paragraph's example, upon registration of the domain "mycompany.com," although the registrar may have collected a fee from the domain registrant, it also may have paid the registry the appropriate registration fee for the allocated .com TLD.

Websites, unless extremely large and complex or have unusual traffic demands, typically reside on a single server and are prepared and maintained by a single individual or entity. Some Internet users, typically those that are larger and more sophisticated, may provide their own hardware, software, and connections to the Internet. But many Internet users either do not have the resources available or do not want to create and maintain the infrastructure necessary to host their own websites. To assist such individuals (or entities), hosting companies exist that offer website hosting services. These hosting service providers typically provide the hardware, software, and electronic communication means necessary to connect multiple websites to the Internet. A single hosting service provider may literally host thousands of websites on one or more hosting servers.

Hosting providers often sell website hosting services based upon the content provider's anticipated memory and bandwidth needs. For example, a content provider may pay a lower monthly fee for 100 gigabytes (GB) of server disk space and 1000 GB of bandwidth than another content provider whose website may require 500 GB and 5000 GB of server disk space and bandwidth, respectively. Content providers must carefully evaluate their website's anticipated storage and bandwidth needs and select their hosting plan accordingly.

Content providers also need to design their websites with security in mind. If not properly designed, the files (and/or databases) that provide the website's functionality may be hacked, and perhaps altered or even overtaken, by unscrupulous or malicious Internet users. For example, some interactive websites may be configured (perhaps by having File Transfer Protocol (FTP) or Web search functionality) to allow users to upload data or files (e.g., photographs, videos, documents, search strings, etc.) to the website, its directories, or databases, thereby exposing the website backend to Internet users.

Such security vulnerabilities may be exploited by many known hacking techniques including SQL injection, Remote File Inclusion (RFI), Local File Inclusion (LFI), or Cross-Site Scripting (XSS). These (and other similar hacking techniques) may cause the uploading of unwanted and potentially malicious files and/or result in the corruption of the files or databases that provide the website's functionality, perhaps rendering the website inoperable.

Similarly, Internet users who access such website content also must keep security in mind. By accessing compromised websites, the Internet user may inadvertently download (perhaps from a hacked hosting server) malware such as viruses, or worms, spyware to their client device (e.g., computer, smartphone, etc.).

Applicant has determined that presently-existing website hosting systems and methods do not provide optimal means for identifying malicious websites, protecting hosting servers against attacks on websites, and/or protecting Internet users from inadvertently downloading malware. Specifically, there is a need for the systems, method for providing a network resource address reputation service described herein.

Systems for Providing an Network Resource Address Reputation Service

Figure 1:
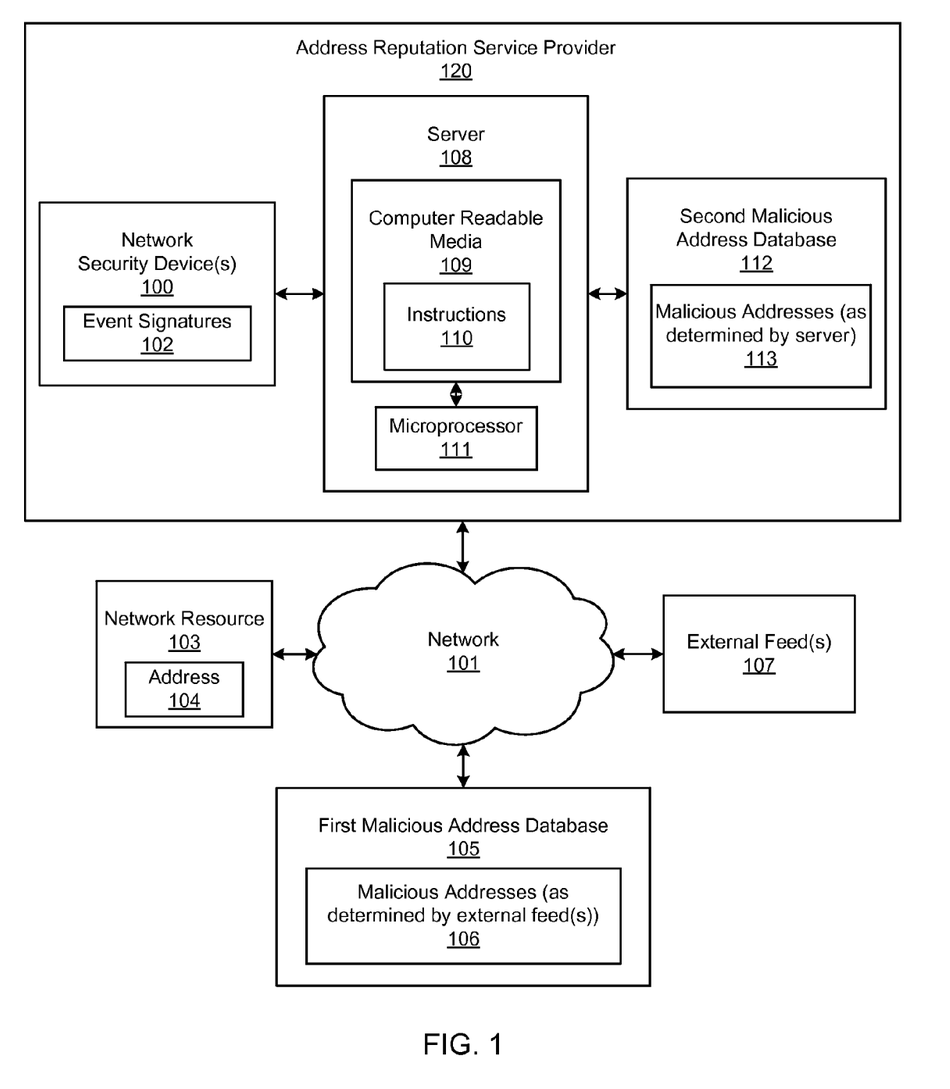
FIG. 1 illustrates a possible embodiment of a system for providing a network resource address reputation service.

FIG. 1 illustrates an embodiment of a system for providing a network resource address reputation service that may comprise one or more network security device 100 (communicatively coupled to a network 101) storing a plurality of event signatures 102 and being configured to determine whether an event associated with a network resource 103 having a network resource address 104 matches one or more of the plurality of event signatures 102, a first malicious network resource address database 105 (communicatively coupled to the network 101) storing a plurality of malicious network resource addresses 106 determined to be malicious by one or more external feeds 107, and one or more server 108 (communicatively coupled to the network 101) configured to (upon a determination that the event matches one or more of the plurality of event signatures 102) generate a reputation score for the network resource address 104 and determine whether the network resource address 104 is present in the first malicious network resource address database 105. If the network resource address 104 is present in the first malicious network resource address database 105, the one or more server 108 may modify the reputation score to indicate a more negative reputation for the network resource address 104 and store (in a second malicious network resource address database 112 communicatively coupled to the network 101) the network resource address 104 in association with the reputation score.

The example embodiments illustrated herein place no limitation on network 101 configuration or connectivity. Thus, as non-limiting examples, the network 101 could comprise the Internet, the public switched telephone network, the global Telex network, computer networks (e.g., an intranet, an extranet, a local-area network, or a wide-area network), wired networks, wireless networks, or any combination thereof.

System components (e.g., servers 108, network resources 103, external feeds 107, network security devices 100, databases 105 and 112, and/or any other component) may be communicatively coupled to the network 101 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof.

Network security device(s) 100 may comprise any network 101 security system, software, or appliance that monitors the activity of network-coupled components (e.g., clients, servers, network storage devices, databases, and/or any other network resource) for malicious activity and, perhaps, identify, log information about, block, and/or report such malicious activity. As non-limiting examples, network security devices 100 may comprise a distributed denial of service (DDoS) mitigation device, an intrusion detection system, an intrusion prevention system, a host-based intrusion prevention system, or a web application firewall.

In a DDoS attack, numerous compromised systems attack a single target and thereby deny service to users of the targeted system. The multitude of incoming traffic to the targeted system effectively shuts it down (or causes a substantial slowdown), thereby denying access to legitimate users. DDoS attacks often are controlled by a master computer that obtained control of numerous client computers by installing backdoor agent, client, or zombie software on the client computers. A DDoS mitigation device may comprise any system, software, or appliance that detects a potential DDoS attack and blocks related malicious traffic, optimally without affecting the flow of legitimate traffic. As non-limiting examples, the illustrated embodiment may be achieved with either commercially-available (e.g., CISCO GUARD or ARBOR PRAVAIL) or proprietary DDoS mitigation systems.

Intrusion detection may comprise monitoring network use and analyzing it for violations of network security, acceptable use policies, or standard security practices. Intrusion prevention may comprise performing intrusion detection and attempting to stop detected violations. Intrusion detection and prevention systems therefore may comprise any system, software, or appliance that identifies violations, logs related information, attempts to stop violations, and reports violations to security administrators. Any type of intrusion detection and prevention system may be used including, but not limited to Network-based Intrusion Prevention Systems (NIPS), Wireless Intrusion Prevention Systems (WIPS), Network Behavior Analysis (NBA), or Host-based Intrusion Prevention (HIPS) (e.g., installed software that monitors a single host for suspicious activity by analyzing events occurring within that host). As non-limiting examples, the illustrated embodiment may be achieved with either commercially-available (e.g., CISCO INTRUSION DETECTION AND PREVENTION, HEWLETT PACKARD TIPPING POINT, or MCAFEE IPS) or proprietary intrusion detection and prevention systems.

A firewall may comprise any system, software, or appliance that permits or denies network traffic based upon a set of rules. A firewall is commonly used to protect networks from unauthorized access while permitting legitimate traffic. A web application firewall is a network-based application layer firewall that operates at the application layer of a protocol stack. Because it acts on the application layer, it may inspect traffic content and block specified content, such as that originating from malicious websites or software. As non-limiting examples, the illustrated embodiment may be achieved with either commercially-available (e.g., CISCO ACE WEB APPLICATION FIREWALL or BARRACUDA NETWORKS WEB APPLICATION FIREWALL) or proprietary firewall devices.

Network security device(s) 100 may detect malicious activity according to any known detection method including, but not limited to, signature-based, statistical anomaly-based, and stateful protocol analysis methods. As a non-limiting example, a signature-based network security device 100 may store, or otherwise have access to (e.g., stored in another network-coupled storage device), a plurality of event signatures 102 and monitor network 101 traffic for matches to these signatures 102.

Such signature-based network security devices 100 may utilize signatures 102, which are simply known attack patterns. Such systems may intercept network 101 packets and collect a stream of transmitted bytes. The stream then may be analyzed to identify strings of characters in the data, known as signatures 102, which may comprise particular strings that have been discovered in known malicious activity. As a non-limiting example, the signatures 102 may be exploit-based or vulnerability-based. Such signatures 102 may be written, perhaps by a network resource reputation service provider 120, based upon prior known attacks.

As non-limiting examples, event signatures 102 may comprise a plurality of malware signatures including, but not limited to a virus signature, a worm signature, a trojan horse signature, a rootkit signature, a backdoor signature, a spyware signature, a keystroke logger signature, or a phishing application signature.

Alternatively, event signatures 102 may comprise a plurality of attack signatures including, but not limited to one or more signatures identifying a botnet attack, a shell code attack, a cross site scripting attack, a SQL injection attack, a directory reversal attack, a remote code execution attack, a distributed denial of service attack, a brute force attack, a remote file inclusion attack, a script injection attack, or an iFrame injection attack.

Network security device(s) 100 also may be configured (perhaps by installing software and/or scripts on the device 100 containing appropriate instructions) to determine whether an event associated with a network resource 103 having a network resource address 104 matches one or more of the event signatures 102. An "event" may comprise any malicious or unwanted activity, perhaps performed by or via a network resource 103 having a network resource address 104. The network resource 103 may comprise any network 101 coupled device (e.g., a hardware and/or software component) having a network resource address.

As non-limiting examples, the network resource 103 may comprise a server (perhaps hosting a website and/or its content), a client computing device, a database, or any network storage device. The network resource address 104 may comprise any address that identifies a network-coupled component, such as the network resource 103. As non-limiting examples, the network resource address may comprise an IP address, a URL, or a domain (e.g., domain name) for the network resource 103.

As non-limiting examples, the event may comprise any of the incidents described above with respect to event signatures 102. In an example embodiment, the event may be matched with an event signature 102 by intercepting network 101 packets, collecting a stream of transmitted data, analyzing the stream to identify strings of characters in the data, and comparing the identified strings with the event signatures 102. Alternatively, any method of determining an event/event signature 102 match known in the art or developed in the future may be used.

The illustrated embodiment also may comprise a first malicious network resource address database 105 (communicatively coupled to the network 101) storing a plurality of malicious network resource addresses 106 determined to be malicious by one or more external feeds 107. As non-limiting examples, the database 105 (and/or any other database described herein) may comprise a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, or other means of data storage located on a computer, client, server, or any other storage device known in the art or developed in the future.

The plurality of malicious network resource addresses 106 stored it the first malicious network resource address database 105 may comprise any network resource address determined to be associated with any malicious or unwanted activity, such as those listed in detail above, by one or more external feeds 107. As non-limiting examples the external feeds 107 may comprise third-party network security services that transmit, perhaps to subscribers, data identifying one or more network resource addresses that have been associated with any malicious or unwanted activity. An external feed 107 may comprise a malware domain list feed, a malware URL list feed, an emerging threat feed, an intrusion detection feed, a botnet tracking feed, a phishing tracking feed, a spam tracking feed, or a compromised network feed. INTERNET STORM CENTER DSHIELD, ZEUS TRACKER, TEAM CYMRU, ARBOR NETWORKS ACTIVE THREAT FEED SECURITY SERVICE, PHISHTANK, and SPAMHAUS all comprise example external feeds 107 that may be used with the illustrated embodiments.

The illustrated embodiment also may comprise one or more server 108 (communicatively coupled to the network 101) configured to (upon a determination that the event matches one or more of the plurality of event signatures 102) generate a reputation score for the network resource address 104. Each of the at least one servers 108 (and/or any other server described herein) could be any computer or program that provides services to other computers, programs, or users either in the same computer or over a computer network 101. As non-limiting examples, the one of more server 108 could be application, communication, mail, database, proxy, fax, file, media, web, peer-to-peer, standalone, software, or hardware servers (i.e., server computers) and may use any server format known in the art or developed in the future (possibly a shared hosting server, a virtual dedicated hosting server, a dedicated hosting server, or any combination thereof).

As further illustrated in FIG. 1, the server 108 may comprise a computer-readable storage media 109 storing instructions 110 that, when executed by a microprocessor 111, cause the server 108 to perform the steps for which it is configured. The computer-readable media 109 may comprise any data storage medium capable of storing instructions 110 for execution by a computing device. It may comprise, as non-limiting examples, magnetic, optical, semiconductor, paper, or any other data storage media, a database or other network storage device, hard disk drives, portable disks, CD-ROM, DVD, RAM, ROM, flash memory, and/or holographic data storage. The instructions 110 may, as non-limiting examples, comprise software and/or scripts stored in the computer-readable media 109 that may be stored locally in the server 108 or, alternatively, in a highly-distributed format in a plurality of computer-readable media 109 accessible via the network 101, perhaps via a grid or cloud-computing environment.

As a non-limiting example, the server 108 may be configured to generate a reputation score for the network resource address 104 by having instructions 110 installed in computer readable media 109 causing the microprocessor 111 to generate such a reputation score. The reputation score may comprise any score indicating the reputation for the network resource address 104 and may comprise any rating or ranking scale known in the art or developed in the future. As non-limiting examples, the link match score may range from 0 to 1, 1 to 10, 0% to 100%, and/or A+ to F− (e.g., grades). Alternatively, it may comprise a star rating system or a color rating system (e.g., red indicates a poor reputation, yellow indicates an average reputation, and green indicates a good reputation).

As one non-limiting example, the range for reputation scores may have a minimum value of 0% and a maximum value of 100%, and may indicate a transition from a negative to a positive reputation when the score exceeds a score 50%. The server 108 may calculate such a reputation score, perhaps by determining a quantity of event signature 102 matches associated with each of a plurality of network resource addresses, determining a quantity of event signature 102 matches associated with the subject network resource's 103 network resource address 104, determining a percentage of the plurality of network resource addresses having a quantity of event signature 102 matches that are higher than the quantity of event signature 102 matches associated with the subject network resource's 103 network resource address 104, and assigning that percentage as the reputation score.

For example, the server 108 may determine that IP address A has 0 signature matches, IP address B has 10 signature matches, IP address C has 20 signature matches, and IP address D has 30 signature matches. If the subject network resource's 103 IP address 104 is determined to have 25 signature matches, then only 25% of the IP addresses would have a higher score than the subject IP address 104. A 25% reputation score then may be assigned to the subject IP address 104, indicating a relatively low quality reputation.

In yet another example embodiment, the server 108 may calculate the reputation score, perhaps by determining a quantity of event signature 102 matches associated with each of a plurality of network resource addresses (wherein the plurality of network resource addresses includes the network resource address 104), sequencing each of the plurality of network resource addresses according to the quantity of event signature 102 matches associated with each network resource address, grouping the quantity of event signature 102 matches according to a common quantity of event signature 102 matches, generating a rolling count for each grouping of the common quantity of event signature 102 matches, assigning a percentile score to each of the quantity of event signature 102 matches according to the rolling count, and assigning the percentile score assigned to the quantity of event signature 102 matches associated with the network resource address as the reputation score for the network resource address 104.

For example, the server 108 may determine that IP address A has 125 signature matches, IP address B has 5 signature matches, IP address C has 5 signature matches, IP address D has 1400 signature matches, and IP address E has 110000 signature matches. The IP addresses then may be sequenced amongst each other according to the quantity of event signature 102 matches associated with each IP addresses, perhaps as follows:

| IP Address | No. of Event Signature Matches |
|---|---|
| IP Address B | 5 |
| IP Address C | 5 |
| IP Address A | 125 |
| IP Address D | 1400 |
| IP Address E | 110000 |

The quantities of event signature 102 matches then may be grouped according to a common quantity of event signature 102 matches, perhaps as follows:

| No. of Matches | No. of Occurrences |
|---|---|
| 5 | 2 |
| 125 | 1 |
| 1400 | 1 |
| 110000 | 1 |

A rolling count for each grouping of common quantity of event signature 102 matches then may be generated, perhaps as follows:

| No. of Matches | No. of Occurrences | Rolling Count |
|---|---|---|
| 5 | 2 | 2 |
| 125 | 1 | 3 |
| 1400 | 1 | 4 |
| 110000 | 1 | 5 |

A percentile score then may be assigned to each quantity of event signature 102 matches according to the rolling count, perhaps as follows:

| No. of Matches | No. of Occurrences | Rolling Count | Percentile Score |
|---|---|---|---|
| 5 | 2 | 2 | 40% = (2/5) * 100 |
| 125 | 1 | 3 | 60% = (3/5) * 100 |
| 1400 | 1 | 4 | 80% = (4/5) * 100 |
| 110000 | 1 | 5 | 100% = (5/5) * 100 |

These percentile scores then may be assigned as reputation scores to the associated IP addresses. In the above example, therefore, IP addresses B and C would be assigned a 40% reputation score. The reputation scores for IP addresses A, D, and E would be 60%, 80%, and 100%, respectively, with IP addresses B and C having the best reputation and IP address E having the worst.

In addition to generating a reputation score for the network resource address 104, the server 108 also may determine whether the network resource address 104 is present in the first malicious network resource address database 105, perhaps by submitting a search query comprising the network resource address 104 to the first malicious network resource address database 105. A determination that the network resource address 104 is present among the plurality of malicious network resource addresses 106 (as determined to be malicious by the external feed(s) 107 described above) stored in the first malicious network resource address database 105 comprises additional information indicating a poor reputation for the network resource address 104. Accordingly, the network resource addresses' 104 reputation score may be modified to indicate a more negative reputation.

For example, in the above example wherein 100% represents the best reputation score and 0% the worst, the reputation score may be adjusted toward 0% by a predetermined percentage (e.g., a 10% reduction) if the network resource address 104 is found in the first malicious network resource address database 105. Alternatively, in the above example wherein 0% represents the best reputation score and 100% the worst, the reputation score may be adjusted toward 100% by a predetermined percentage (e.g., a 10% increase) if the network resource address 104 is found in the first malicious network resource address database 105.

The system illustrated in FIG. 1 further may comprise a second malicious network resource address database 112 being communicatively coupled to the network 101. Once the server 108 has calculated the reputation score for the network resource address 104, both the network resource address 104 and its reputation score may be stored in the second malicious network resource address database 112, perhaps among a plurality of malicious network resource addresses 113 and their associated reputation scores as determined by the server 108. This illustrated embodiment may provide the network resource reputation service provider 120 with a collection of network resource address reputation data that may be used, perhaps, to determine whether to connect to a network resource address present in the second malicious network resource address database 112.

The server 108 also may be configured to determine whether the network resource addresses' 104 reputation score exceeds a predetermined value and, if so, add the network resource address 104 to a blacklist, perhaps stored in the second malicious network resource address database 112 or any other network storage device or computer memory communicatively coupled to the network 101. For example, if the predetermined value is 50%, any network resource address having a reputation score worse than 50% may be added to the blacklist, perhaps resulting in blocking connection to—or otherwise precluding communication with—that network resource address.

Figure 2:
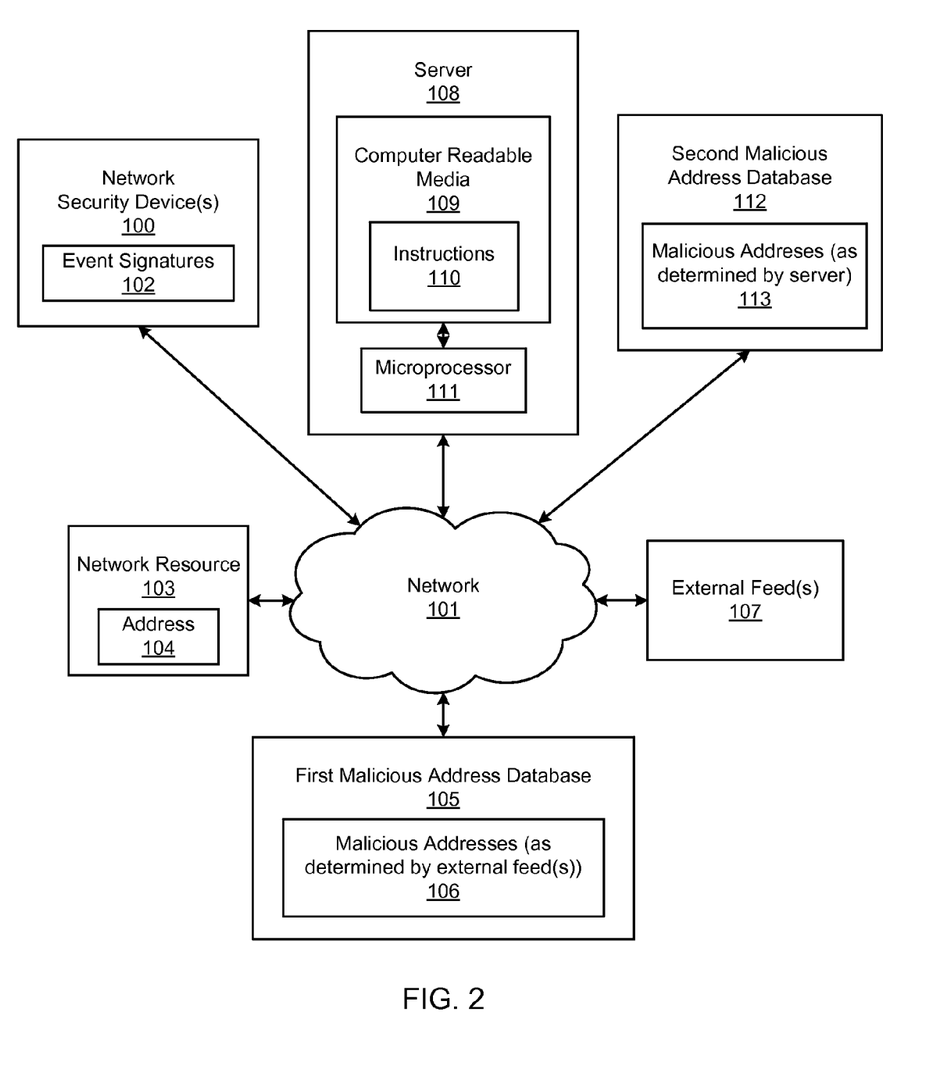
FIG. 2 illustrates a possible embodiment of a system for providing a network resource address reputation service.

FIG. 2 illustrates an alternate, highly-distributed embodiment of a system for providing a network resource address reputation service, wherein the network resource reputation service provider's 120 internal system components (network security device(s) 100, server(s) 108, and/or second malicious network resource address database(s) 112) may comprise independent, distributed, and standalone systems, each perhaps running on one of more different or geographically-disparate servers coupled to the network 101.

Figure 3:
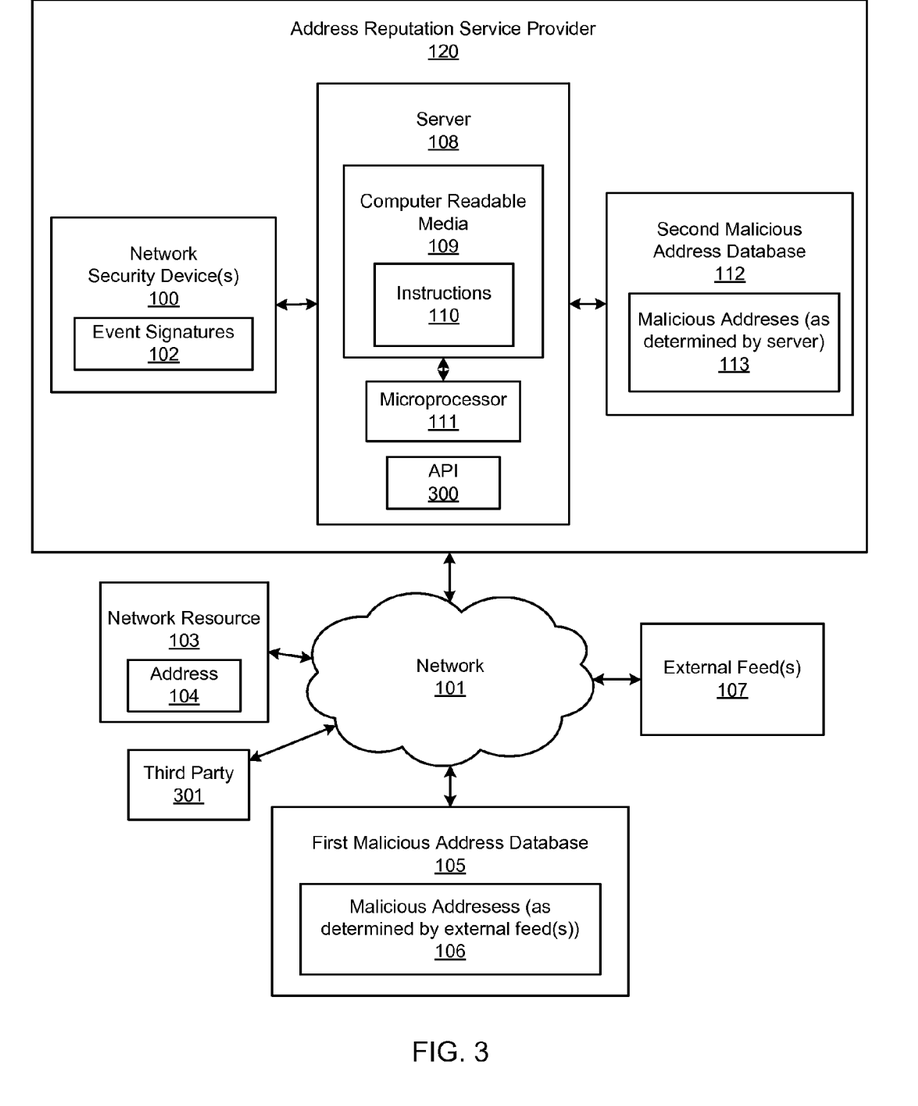
FIG. 3 illustrates a possible embodiment of a system for providing a network resource address reputation service.

As illustrated in FIG. 3, the network resource reputation service provider 120 may make the data stored in the second malicious network resource address database 112 available to third parties 301, perhaps via an applications programming interface (API) 300 running on one or more of the network resource reputation service provider's 120 servers 108 or the second malicious network resource address database 112. Third parties 301 may comprise any individual, entity, system, hardware, or software wishing to obtain reputation data regarding network resource addresses including, but not limited to, Internet users, website hosting providers, web browsers, network security providers, or corporate, governmental, or educational institution MIS managers. An API 300 via which third parties 301 may receive such data may comprise computer-readable code that, when executed, causes the API 300 to receive a procedure call (i.e., function call) requesting network resource reputation data. Responsive to receipt of the procedure call, the API 300 may transmit the requested data to the requesting third party 301.

The API 300 may comprise a software-to-software interface that specifies the protocol defining how independent computer programs interact or communicate with each other. The API 300 may allow the network resource reputation service provider's 120 software to communicate and interact with third parties 301—perhaps over the network 101—through a series of function calls (requests for services). It may comprise an interface running on a server 108 or database 112 that supports function calls made of the described inventions by other computer programs. The API 300 may comprise any API type known in the art or developed in the future including, but not limited to, request-style, Berkeley Sockets, Transport Layer Interface (TLI), Representational State Transfer (REST), SOAP, Remote Procedure Calls (RPC), Standard Query Language (SQL), file transfer, message delivery, and/or any combination thereof.

Methods of Providing a Network Resource Address Reputation Service

Figure 4:
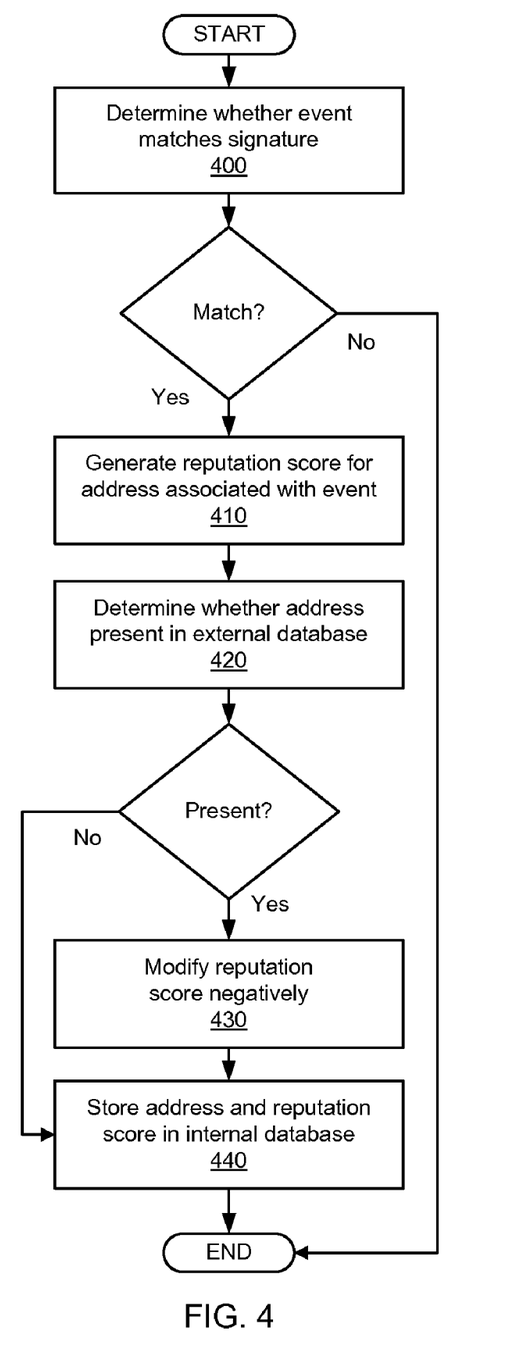
FIG. 4 is a flow diagram illustrating a possible embodiment of a method of providing a network resource address reputation service.

As a non-limiting example, the method illustrated in FIG. 4 (and all methods described herein) may be performed by (at least) any central processing unit (CPU) in one or more computing devices or systems, such as a microprocessor 111 running on a server 108 communicatively coupled to a network 101 (e.g., the Internet) and executing instructions 110 stored (perhaps as scripts and/or software) in computer-readable media accessible to the CPU, such as a hard disk drive or solid-state memory on a server 108. Example systems that may be used to perform the methods described herein are illustrated in FIGS. 1-3 and described in detail above.

FIG. 4 illustrates an embodiment of a method of providing a network resource address reputation service that may comprise determining whether an event associated with a network resource address 104 matches one or more of a plurality of event signatures 102 in one or more network security device 100 (Step 400). As non-limiting examples, Step 400 may be accomplished by the network security device(s) 100, server(s) 108, or external feed(s) 107 as described in detail above. The quantity of event signature 102 matches may be determined (Step 400) over a predetermined period of time, perhaps hourly, daily, or weekly. The predetermined period of time may remain consistent, or it may vary.

Responsive to a determination that the event associated with the network resource address 104 matches an event signature(s) 102, the illustrated method further may comprise generating a reputation score for the network resource address 104 (Step 410). As a non-limiting example, this step may be accomplished by a server 108 configured to generate a reputation score for the network resource address 104 by having instructions 110 installed in computer readable media 109 causing the microprocessor 111 to generate such a reputation score. The reputation score may comprise any score indicating the reputation for the network resource address 104 and may comprise any rating or ranking scale known in the art or developed in the future. As non-limiting examples, the link match score may range from 0 to 1, 1 to 10, 0% to 100%, and/or A+ to F− (e.g., grades). Alternatively, it may comprise a star rating system or a color rating system (e.g., red indicates a poor reputation, yellow indicates an average reputation, and green indicates a good reputation).

The server 108 then may determine whether the network resource address 104 is present in a first malicious network resource address database 105 (Step 420), perhaps by submitting a search query comprising the network resource address 104 to the first malicious network resource address database 105. Responsive to a determination that the network resource address 104 is not present in the first malicious network resource address database 105, the method may comprise storing, in a second malicious network resource address database 112, the network resource address 104 in association with its reputation score (Step 440).

Responsive to a determination that the network resource address 104 is present in said first malicious network resource address database 105, the illustrated method further may comprise modifying the reputation score to indicate a more negative reputation for the network resource address 104 (Step 430). For example, in the above example wherein 100% represents the best reputation score and 0% the worst, the reputation score may be adjusted toward 0% by a predetermined percentage (e.g., a 10% reduction) if the network resource address 104 is found in the first malicious network resource address database 105. Alternatively, in the above example wherein 0% represents the best reputation score and 100% the worst, the reputation score may be adjusted toward 100% by a predetermined percentage (e.g., a 10% increase) if the network resource address 104 is found in the first malicious network resource address database 105. The modified reputation score then may be stored (perhaps in the second malicious network resource address database 112) in association with the network resource address 104 (Step 440).

Figure 5:
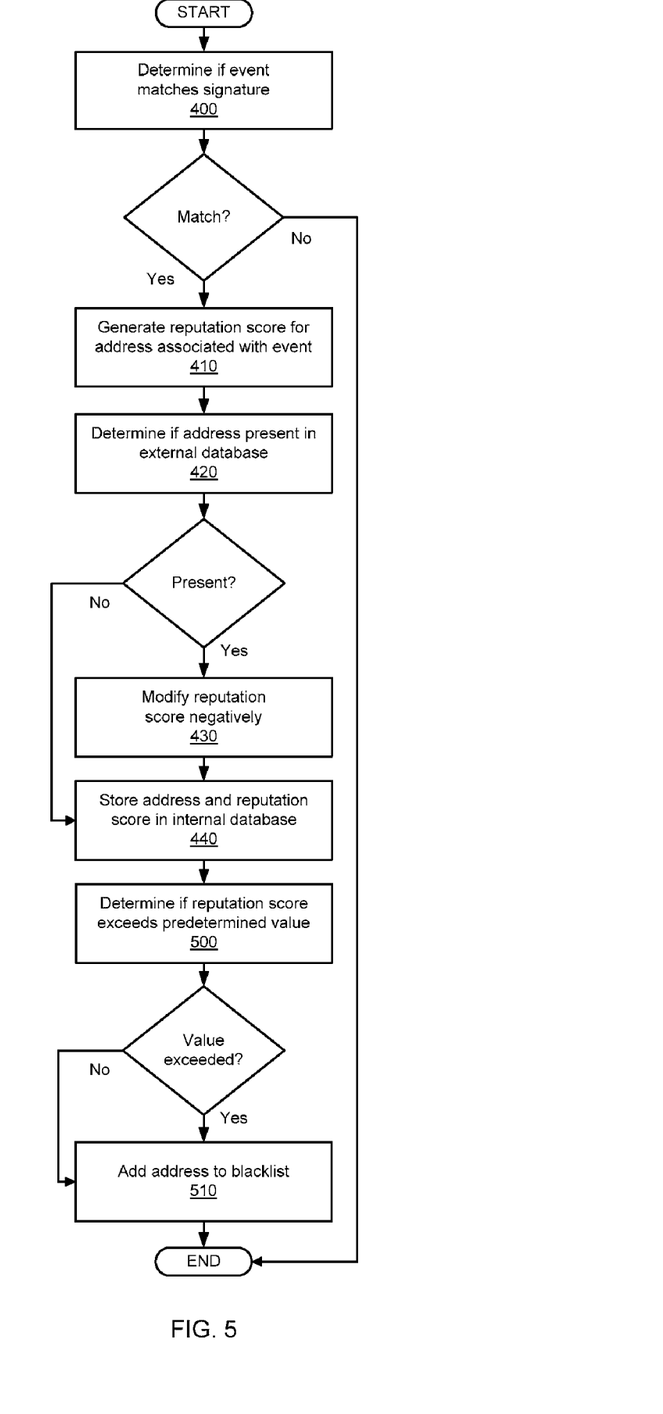
FIG. 5 is a flow diagram illustrating a possible embodiment of a method of providing a network resource address reputation service.

FIG. 5 illustrates an alternate embodiment of a method of providing a network resource address reputation service that builds upon that illustrated in FIG. 4 and further may comprise determining whether the network resource addresses' 104 reputation score exceeds a predetermined value (Step 500) and, if so, adding the network resource address 104 to a blacklist (Step 510), perhaps stored in the second malicious network resource address database 112 or any other network storage device or computer memory communicatively coupled to the network 101. For example, if the predetermined value is 50%, any network resource address having a worse reputation score that 50% may be added to the blacklist, perhaps resulting in blocked connection to—or otherwise precluding communication with—that network resource address.

Figure 6:
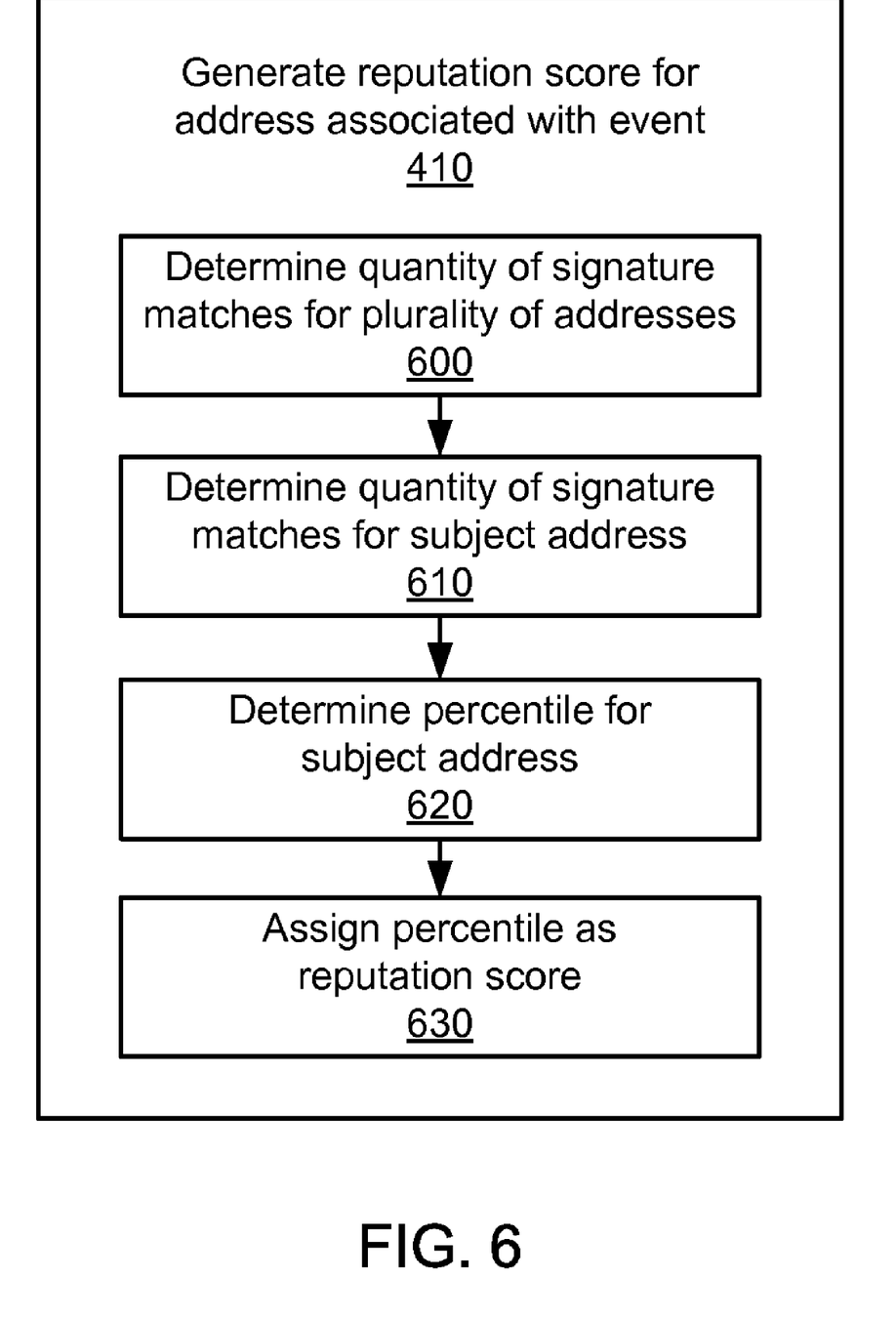
FIG. 6 is a flow diagram illustrating a possible embodiment of a method of generating a reputation score for a network resource address associated with an event matching a signature in a network security device.

FIG. 6 illustrates a possible embodiment of a method of generating a reputation score for the network resource address 104 (Step 410) that may comprise determining a quantity of event signature 102 matches associated with each of a plurality of network resource addresses (Step 600), determining a quantity of event signature 102 matches associated with the subject network resource's 103 network resource address 104 (Step 610), determining a percentage of the plurality of network resource addresses having a quantity of event signature 102 matches that are higher than the quantity of event signature 102 matches associated with the subject network resource's 103 network resource address 104 (Step 620), and assigning that percentage as the reputation score (Step 630).

For example, the server 108 may determine that IP address A has 0 signature matches, IP address B has 10 signature matches, IP address C has 20 signature matches, and IP address D has 30 signature matches. If the subject network resource's 103 IP address 104 is determined to have 25 signature matches, then only 25% of the IP addresses would have a higher score than the subject IP address 104. A 25% reputation score then may be assigned to the subject IP address 104, indicating a relatively low quality reputation.

Figure 7:
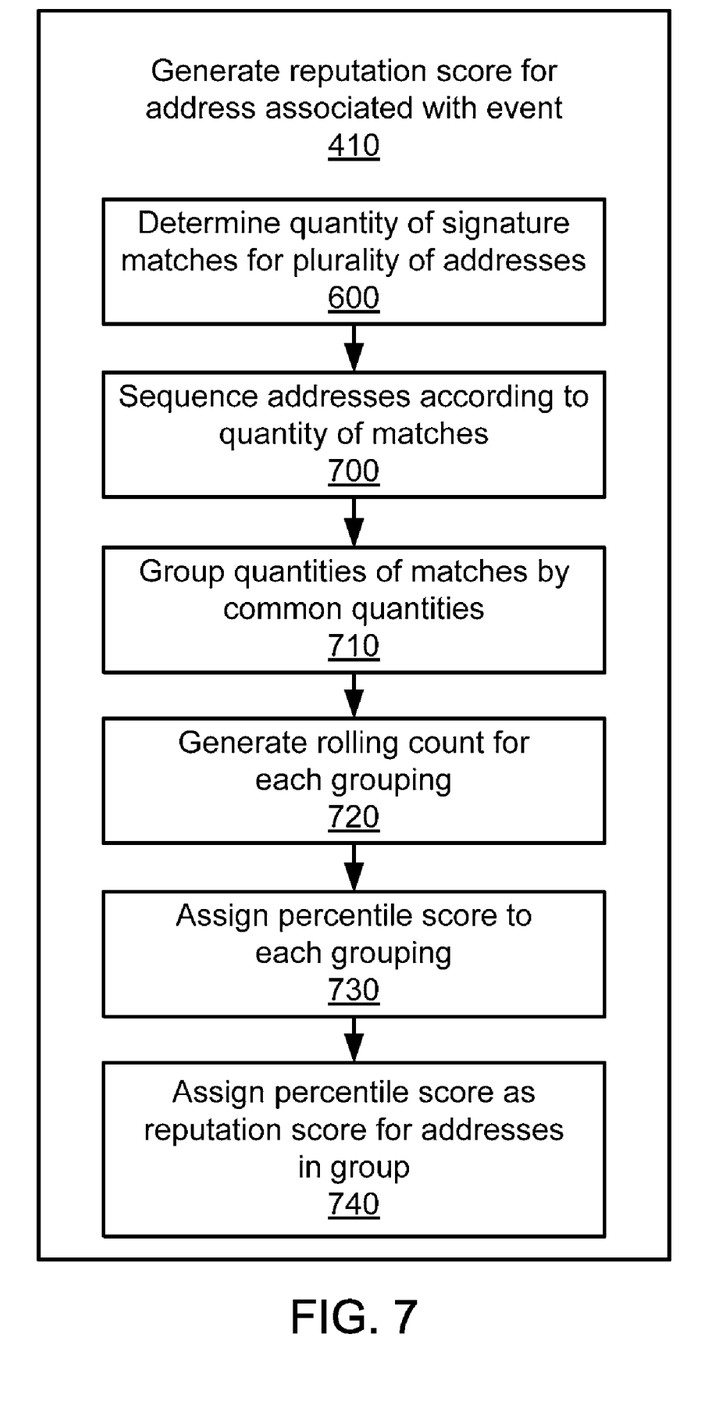
FIG. 7 is a flow diagram illustrating a possible embodiment of a method of generating a reputation score for a network resource address associated with an event matching a signature in a network security device.

FIG. 7 illustrates a possible embodiment of a method of generating a reputation score for the network resource address 104 (Step 410) that may comprise determining a quantity of event signature 102 matches associated with each of a plurality of network resource addresses (Step 600) (wherein the plurality of network resource addresses includes the network resource address 104), sequencing each of the plurality of network resource addresses according to the quantity of event signature 102 matches associated with each of the plurality of network resource addresses (Step 700), grouping the quantity of event signature 102 matches according to a common quantity of event signature 102 matches (Step 710), generating a rolling count for each grouping of the common quantity of event signature 102 matches (Step 720), assigning a percentile score to each of the quantity of event signature 102 matches associated with each of a plurality of network resource addresses according to the rolling count (Step 730), and assigning the percentile score assigned to the quantity of event signature 102 matches associated with the network resource addresses as the reputation score for the network resource address 104 (Step 740).

For example, the server 108 may determine that IP address A has 125 signature matches, IP address B has 5 signature matches, IP address C has 5 signature matches, IP address D has 1400 signature matches, and IP address E has 110000 signature matches (Step 600). The IP addresses then may be sequenced amongst each of other according to the quantity of event signature 102 matches associated with each IP addresses, perhaps as follows (Step 700):

| IP Address | No. of Event Signature Matches |
| --- | --- |
| IP Address B | 5 |
| IP Address C | 5 |
| IP Address A | 125 |
| IP Address D | 1400 |
| IP Address E | 110000 |

The quantities of event signature 102 matches then may be grouped according to a common quantity of event signature 102 matches, perhaps as follows (Step 710):

| No. of Matches | No. of Occurrences |
| --- | --- |
| 5 | 2 |
| 125 | 1 |
| 1400 | 1 |
| 110000 | 1 |

A rolling count for each grouping of common quantity of event signature 102 matches then may be generated, perhaps as follows (Step 720):

| No. of Matches | No. of Occurrences | Rolling Count |
| --- | --- | --- |
| 5 | 2 | 2 |
| 125 | 1 | 3 |
| 1400 | 1 | 4 |
| 110000 | 1 | 5 |

A percentile score then may be assigned to each quantity of event signature 102 matches according to the rolling count, perhaps as follows (Step 730):

| No. of Matches | No. of Occurrences | Rolling Count | Percentile Score |
|---|---|---|---|
| 5 | 2 | 2 | 40% = (2/5) * 100 |
| 125 | 1 | 3 | 60% = (3/5) * 100 |
| 1400 | 1 | 4 | 80% = (4/5) * 100 |
| 110000 | 1 | 5 | 100% = (5/5) * 100 |

These percentile scores then may be assigned as reputation scores to the associated network resource addresses (Step 740). In the above example, therefore, IP addresses B and C would be assigned a 40% reputation score. The reputation scores for IP addresses A, D, and E would be 60%, 80%, and 100%, respectively, with IP addresses B and C having the best reputation and IP address E having the worst.

Figure 8:
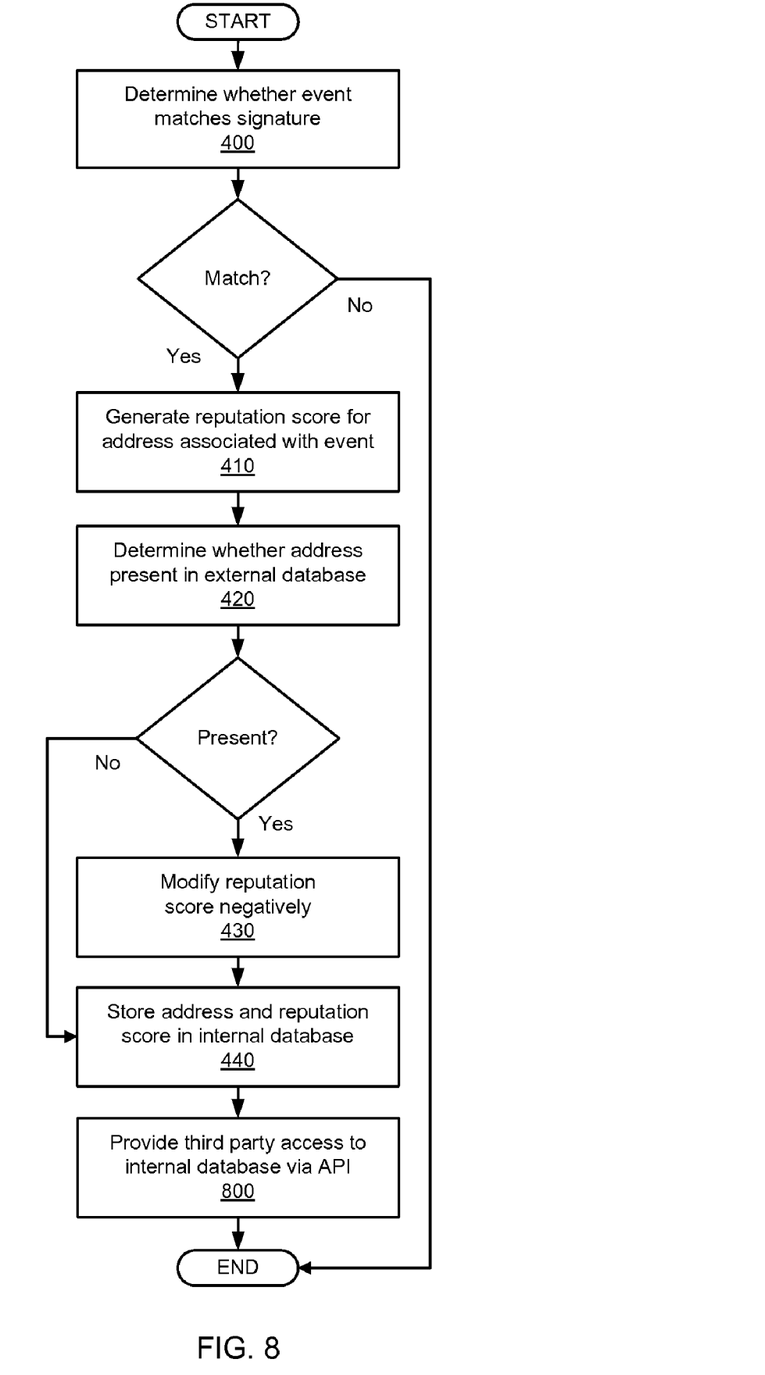
FIG. 8 is a flow diagram illustrating a possible embodiment of a method of providing a network resource address reputation service.

FIG. 8 illustrates an alternate embodiment of a method of providing a network resource address reputation service that builds upon that illustrated in FIG. 4 and further may comprise providing a plurality of third parties 301 access to the second malicious network resource address database 112 via an applications programming interface 300 (Step 800), perhaps as described above with respect to FIG. 3. Such an embodiment may enable a network resource reputation service provider 120 to provide network resource reputation data as a service to third parties 301 wishing to obtain reputation data regarding network resource addresses including, but not limited to, Internet users, website hosting providers, web browsers, network security providers, or corporate, governmental, or educational institution MIS managers. Such a service may be provided, perhaps on a subscription basis.

Other embodiments and uses of the above inventions will be apparent to those having ordinary skill in the art upon consideration of the specification and practice of the inventions disclosed herein. The specification and examples given should be considered exemplary only, and it is contemplated that the appended claims will cover any other such embodiments or modifications as fall within the true scope of the inventions.

The Abstract accompanying this specification is provided to enable the United States Patent and Trademark Office and the public generally to determine quickly from a cursory inspection the nature and gist of the technical disclosure and in no way intended for defining, determining, or limiting the present inventions or any of its embodiments.

The inventions claimed are:

1. A system comprising:
A) one or more network security device being communicatively coupled to a network and:
  i) storing a plurality of event signatures; and
  ii) configured to determine whether an event associated with a first network resource having a first network resource address matches one or more of said plurality of event signatures;
B) a first malicious network resource address database being communicatively coupled to said network and storing a plurality of malicious network resource addresses determined to be malicious by one or more external feeds;
C) one or more server computer being communicatively coupled to said network and configured to, responsive to a determination that said event matches one or more of said plurality of event signatures:
  i) generate a reputation score for said first network resource address by:
    a) determining a quantity of event signature matches associated with each of a plurality of network resource addresses, wherein said plurality of network resource addresses includes said first network resource address;
    b) sequencing each of said plurality of network resource addresses amongst each of said plurality of network resource addresses according to said quantity of event signature matches associated with each of said plurality of network resource addresses;
    c) grouping said quantity of event signature matches associated with each of said plurality of network resource addresses according to a common quantity of event signature matches;
    d) generating a rolling count for each grouping of said common quantity of event signature matches;
    e) assigning a percentile score to each of said quantity of event signature matches associated with each of said plurality of network resource addresses according to said rolling count; and
    f) assigning the percentile score assigned to the quantity of event signature matches associated with said network resource addresses as said reputation score for said first network resource address;
  ii) determine whether said first network resource address is present in said first malicious network resource address database;
  iii) responsive to a determination that said first network resource address is present in said first malicious network resource address database, modify said reputation score to indicate a more negative reputation for said first network resource address; and
  iv) store, in a second malicious network resource address database, said first network resource address in association with said reputation score; and
D) said second malicious network resource address database being communicatively coupled to said network.

2. The system of claim 1, wherein said network comprises the Internet.

3. The system of claim 2, wherein said one or more network security devices comprise a distributed denial of service mitigation device, an intrusion detection system, an intrusion prevention system, a host-based intrusion prevention system, or a web application firewall.

4. The system of claim 3, wherein said plurality of event signatures comprise a plurality of malware signatures.

5. The system of claim 4, wherein said plurality of malware signatures comprise a virus signature, a worm signature, a trojan horse signature, a rootkit signature, a backdoor signature, a spyware signature, a keystroke logger signature, or a phishing application signature.

6. The system of claim 3, wherein said plurality of event signatures comprise a plurality of attack signatures.

7. The system of claim 6, wherein said plurality of attack signatures comprise one or more signatures identifying a botnet attack, a shell code attack, a cross site scripting attack, a SQL injection attack, a directory reversal attack, a remote code execution attack, a distributed denial of service attack, a brute force attack, a remote file inclusion attack, a script injection attack, or an iFrame injection attack.

8. The method of claim 1, wherein said one or more external feeds comprises a malware domain list feed, a malware URL list feed, an emerging threat feed, an intrusion detection feed, a botnet tracking feed, a phishing tracking feed, a spam tracking feed, or a compromised network feed.

9. The system of claim 1, wherein said one or more server computer is further configured to:

D) determine whether said reputation score exceeds a predetermined value; and

E) responsive to a determination that said reputation score exceeds said predetermined value, add said first network resource address to a blacklist.

10. The system of claim 1, wherein said at least one server computer further comprise an applications programming interface providing a plurality of third parties access to said second malicious network resource address database.

11. A system comprising, one or more server computer communicatively coupled to a network and configured to:
- A) determine whether an event associated with a first network resource having a first network resource address matches one or more of a plurality of event signatures stored in one or more network security device;
- B) responsive to a determination that said event matches said one or more of a plurality of event signatures, generate a reputation score for said first network resource address by:
  - i) determining a quantity of event signature matches associated with each of a plurality of network resource addresses, wherein said plurality of network resource addresses includes said first network resource address;
  - ii) sequencing each of said plurality of network resource addresses amongst each of said plurality of network resource addresses according to said quantity of event signature matches associated with each of said plurality of network resource addresses;
  - iii) grouping said quantity of event signature matches associated with each of said plurality of network resource addresses according to a common quantity of event signature matches;
  - iv) generating a rolling count for each grouping of said common quantity of event signature matches;
  - v) assigning a percentile score to each of said quantity of event signature matches associated with each of said plurality of network resource addresses according to said rolling count; and
  - vi) assigning the percentile score assigned to the quantity of event signature matches associated with said network resource addresses as said reputation score for said first network resource address;
- C) determine whether said first network resource address is stored in a first malicious network resource address database storing a plurality of malicious network resource addresses determined to be malicious by one or more external feeds;
- D) responsive to a determination that said first network resource address is present in said first malicious network resource address database, modify said reputation score to indicate a more negative reputation for said first network resource address; and
- E) store said first network resource address in association with said reputation score in a second malicious network resource address database.

12. The system of claim 11, wherein said network comprises the Internet.

13. The system of claim 12, wherein said one or more network security device comprises a distributed denial of service mitigation device, an intrusion detection system, an intrusion prevention system, a host-based intrusion prevention system, or a web application firewall.

14. The system of claim 13, wherein said plurality of event signatures comprise a plurality of malware signatures.

15. The system of claim 14, wherein said plurality of malware signatures comprise a virus signature, a worm signature, a trojan horse signature, a rootkit signature, a backdoor signature, a spyware signature, a keystroke logger signature, or a phishing application signature.

16. The system of claim 13, wherein said plurality of event signatures comprise a plurality of attack signatures.

17. The system of claim 16, wherein said plurality of attack signatures comprise one or more signatures identifying a botnet attack, a shell code attack, a cross site scripting attack, a SQL injection attack, a directory reversal attack, a remote code execution attack, a distributed denial of service attack, a brute force attack, a remote file inclusion attack, a script injection attack, or an iFrame injection attack.

18. The system of claim 11, wherein said one or more external feeds comprises a malware domain list feed, a malware URL list feed, an emerging threat feed, an intrusion detection feed, a botnet tracking feed, a phishing tracking feed, a spam tracking feed, or a compromised network feed.

19. The system of claim 12, wherein said one or more server computer is further configured to:
- F) determine whether said reputation score exceeds a predetermined value; and
- G) responsive to a determination that said reputation score exceeds said predetermined value, add said first network resource address to a blacklist.

20. The system of claim 12, wherein said at least one server computer further comprise an applications programming interface providing a plurality of third parties access to said second malicious network resource address database.

* * * * *